June 17, 1941.   A. E. MAYNARD   2,246,055
LENS CUTTING MACHINE
Filed April 25, 1938   3 Sheets-Sheet 1
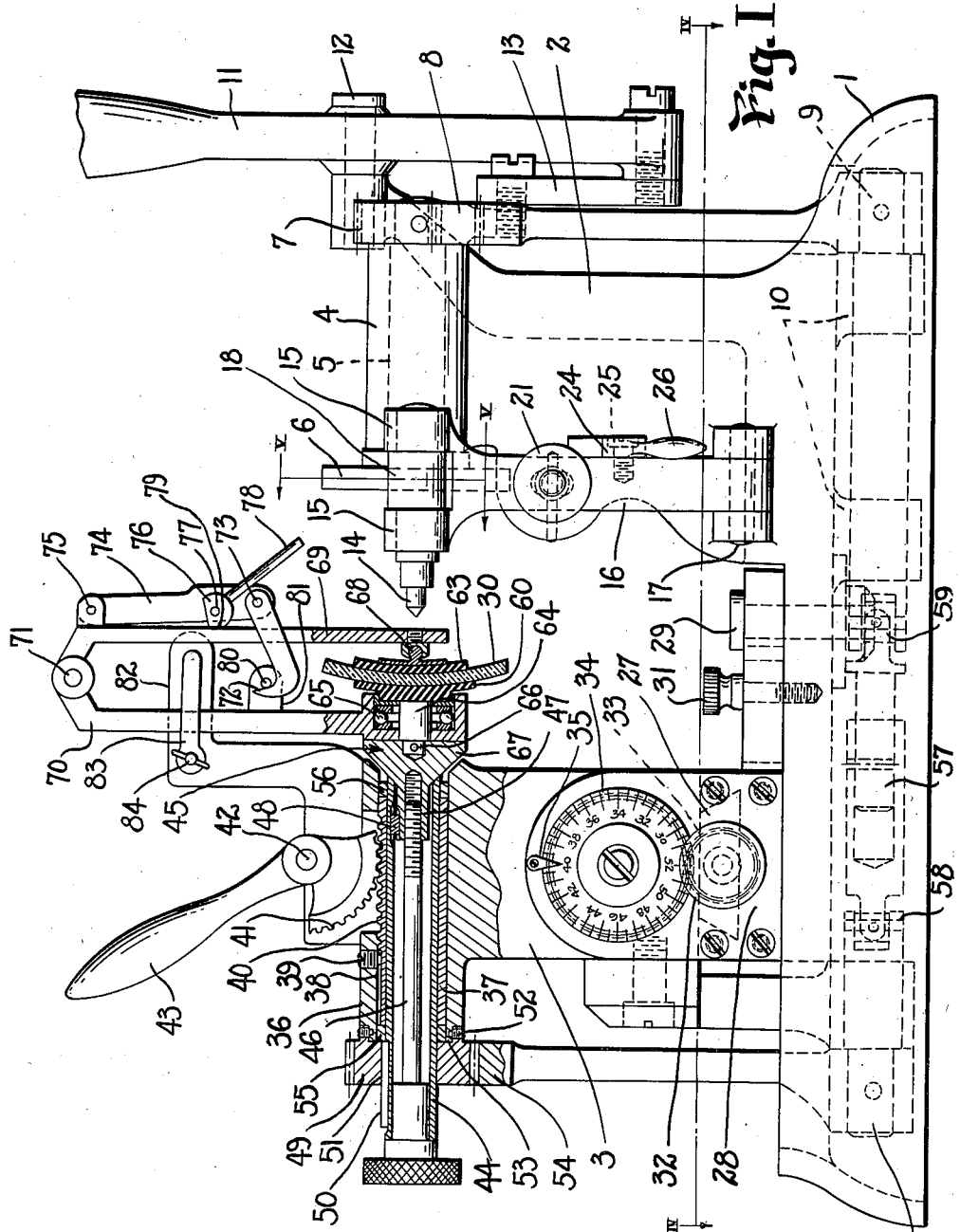
INVENTOR
ALBERT E. MAYNARD.
BY
Harry H. Styll.
ATTORNEY

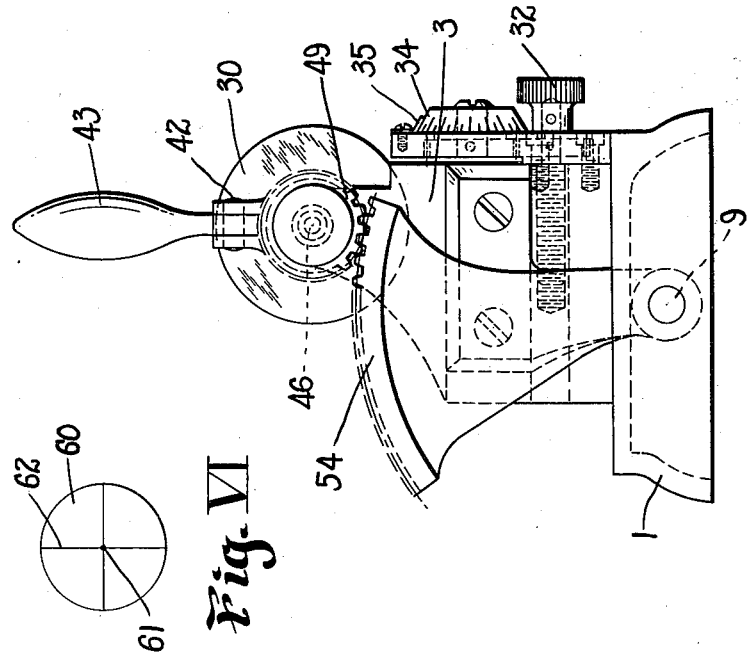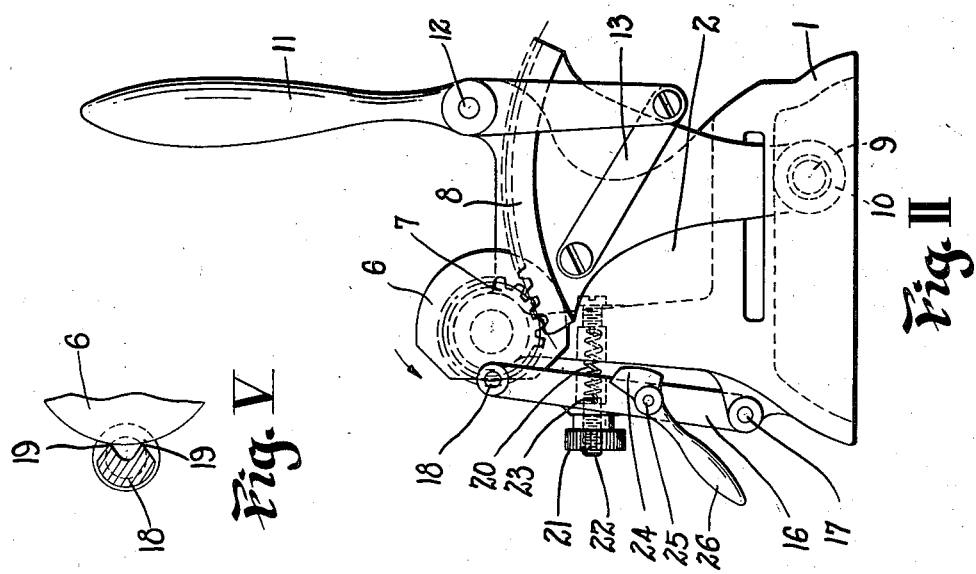

June 17, 1941.  A. E. MAYNARD  2,246,055
LENS CUTTING MACHINE
Filed April 25, 1938  3 Sheets-Sheet 3
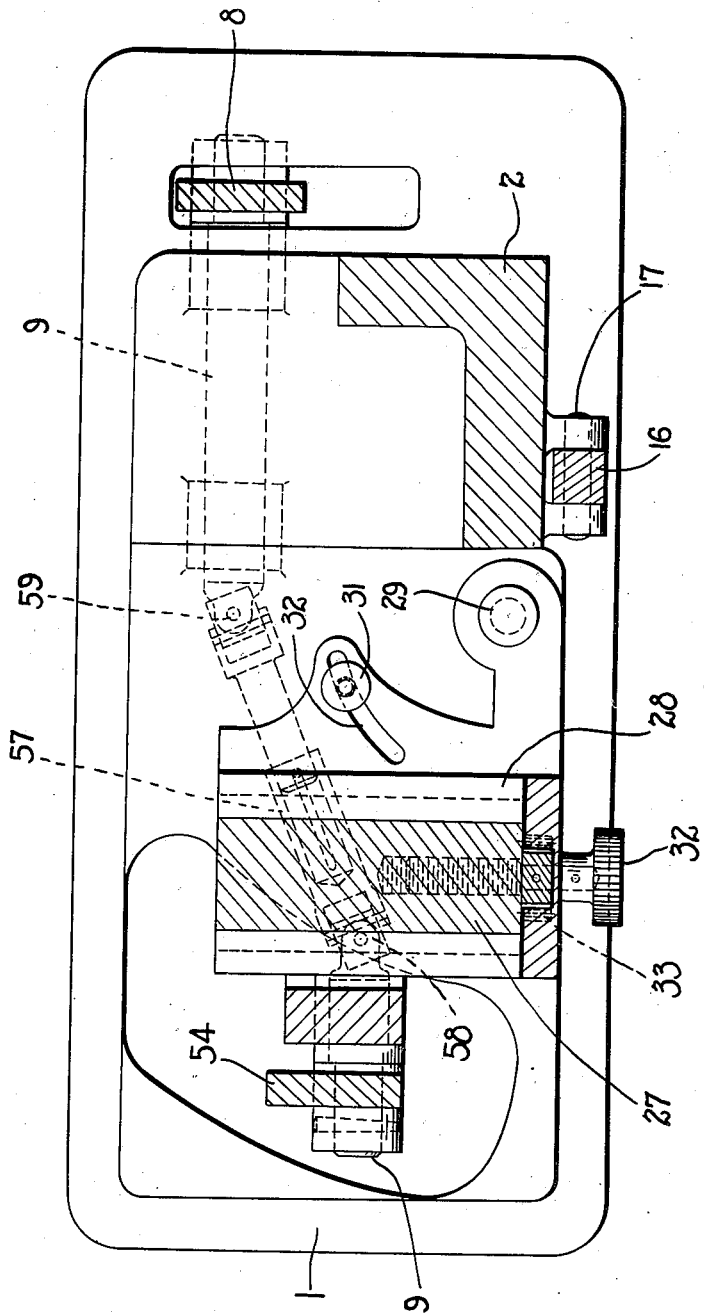
Fig. IV
INVENTOR
ALBERT E. MAYNARD
BY
Harry H. Styll
ATTORNEY Patented June 17, 1941

2,246,055

UNITED STATES PATENT OFFICE 2,246,055

LENS CUTTING MACHINE

Albert E. Maynard, Southbridge, Mass., assignor to American Optical Company, Southbridge, Mass., a voluntary association of Massachusetts Application April 25, 1938, Serial No. 204,028

6 Claims. (Cl. 33—28)

This invention relates to improvements in optical machinery and has particular reference to a novel machine for cutting glass articles such as lenses.

One of the principal objects of the invention is to provide a machine of the above character which will enable accurate location of the work or lens relative to the cutting tool and which will permit a more positive control of the path of the cut and the pressure of the cutting tool on the work or lens being cut.

Another object of the invention is to provide a novel tool supporting mechanism and means for controlling the path of movement of the tool relative to the work or lens being cut which will permit the accurate cutting of irregular contour shapes.

Another object is to so dispose the lens relative to the cutting tool that the particles of glass resulting from the cut formed by the cutting tool will fall free from the surface of the lens being cut under the action of gravity.

Another object is to provide a machine of the above character wherein the work or lens being cut will revolve one complete revolution relative to the cutting tool.

Another object is to provide a separate lens or work holding device in which the lens may be accurately aligned and quickly and accurately positioned in the cutting machine without having to remove the work or lens from said holding device.

Another object is to provide a simplified construction of machine of the above character whereby the various parts may be quickly and easily adjusted.

Another object is to provide supporting mechanism for the work or lens to be cut which will permit the work or lens to be so disposed relative to the cutting tool that the surface portion engaged by said tool will be disposed in a plane substantially normal to the axis of the tool.

Other objects and advantages of the invention should become apparent from the following description taken in connection with the accompanying drawings and it is to be understood that many changes in the details of construction and arrangement of parts may be made without departing from the spirit of the invention as expressed in the accompanying claims. I, therefore, do not wish to be limited to the exact details of construction and arrangements shown and described as the preferred form only has been given by way of illustration.

Referring to the drawings:

Fig. I is a front elevation of the device embodying the invention showing a portion of the work holding head in cross section;

Fig. II is a right end view of the device shown in Fig. I;

Fig. III is a left end view of the device shown in Fig. I;

Fig. IV is a sectional view taken as on line IV—IV of Fig. I and looking in the direction as indicated by the arrows;

Fig. V is a fragmentary sectional view taken as on line V—V of Fig. I and looking in the direction indicated by the arrows; and Fig. VI is a face view of the pad 60.

In the art of cutting lenses it is especially important and essential that the lens be accurately supported during the cutting thereof. This proper supporting of the lens extends to the accurate alignment of the optical center thereof with the center of rotation of the work supporting table with which the lens is rotated and also to the aligning of the major axes of the lens with the transverse and vertical meridians of the pattern which controls the resulting contour shape of the lens.

It has been usual in the past, in machines of the character described, to position the work or lens to be cut in a holding device formed as an integral part of the machine. With most prior art constructions overhanging portions of the machine, such as the tool supporting head, etc., prevented direct vision of the work supporting portion of the machine so that much difficulty was encountered in accurately positioning the lens in the holding device.

Much difficulty was also encountered in controlling the path of movement of the tool relative to the work or lens being cut particularly in cutting odd-shaped contours. This difficulty arose through the failure of the tool supporting head to maintain intimate contact with the former which controls the resultant shape of the lens being cut particularly when such shapes embodied sharply defined corners, etc.

Another difficulty arose through the inability with most prior art devices to control the pressure of the tool on the work during the cutting thereof and the position at which the face of the work being cut was disposed relative to the axis of the cutting tool.

One of the prime objects, therefore, of the present invention is to overcome the above difficulties by providing a separate lens holder in which the lens may be secured to the cutting machine without disturbing the lens and may be adjusted so that the face of the lens being cut may be disposed at the point of contact of the cutting tool substantially normal to the axis of said cutting tool and with which the pressure of the cutting tool on the work or lens being cut may be more positively controlled.

Another feature of the present invention resides in the construction of the tool supporting mechanism whereby the tool will more positively follow the path of cut desired.

Referring more particularly to the drawings wherein like characters of reference designate like parts throughout the several views, the device embodying the invention comprises broadly a base 1 having a former and tool supporting head 2 adjacent one end thereof and a work supporting head 3 adjacent its opposite end. The tool supporting head 2 has a bearing 4 in which a shaft 5 is rotatably supported. The shaft 5 has a former 6 adjacent one end thereof shaped to the resultant contour shape of the lens being cut and a gear 7 adjacent its opposite end which meshes with a gear sector 8 by which the former is rotated. The gear sector 8 is mounted on a shaft 9 pivoted in suitable bearings 10 in the base of the machine. Motion is imparted to the gear sector 8 through a hand lever 11 which is pivoted at 12 to the head 2 and which is connected to the gear sector 8 by a pivoted link 13. The cutting tool 14 is pivotally supported in spaced bearings 15 formed on a lever 16 pivotally connected to the base 1 as illustrated at 17. The shaft in which the tool 14 is supported is provided with a contact shoe 18 which engages the contour of the former 6 and which is so constructed as to rotate the cutting tool 14 about the axis of the bearings 15 when the said contact shoe is following the contour shape of the former 6. This causes a cutting edge of the tool to be constantly disposed in the direction of the cut and results from the provision of spaced contact points 19 formed on the contact shoe 18, as illustrated in Fig. V. The contact shoe 18 is adapted to be constantly urged toward the former 6 by a spring or other suitable means 20 whose tension may be varied by an adjustable nut 21 threadedly connected to a threaded member 22 to which the end 23 of the spring 20 is attached. The opposite end of the spring 20 is attached to the head 2 so that when the nut 21 is tightened more pressure will be asserted on the contact shoe 18. The lever 16 may be held clear of the former 6 by means of a cam member 24 pivotally connected at 25 to the lever 16 and which is operated through a lever extension 26.

The work supporting head 3 has a slide connection 27 with a slide block 28 pivotally connected at 29 to the base 1. The said slide block 28 and head 3 supported thereby is adapted to be moved to varying angular positions about the center of the pivot 29 to control the position of the plane of the work or lens 30 relative to the longitudinal axis of the cutting tool 14. The block 28 is held in adjusted position by means of a clamp screw 31 which extends through an arcuate slot 32 formed in an extension on the block 28, as illustrated in Figs. I and IV. The slide 27 and work supporting head carried thereby is adjustable longitudinally in the slideway in the block 28 by a thumb screw or the like 32. The purpose of this slide connection is to vary the distance between the center of the lens and the longitudinal axis of the cutting tool so that the resultant size of the lens may be definitely controlled. The thumb screw 32 has a gear connection 33 with a suitable dial 34 and indicator means 35 by which the resultant size of the lens may be predetermined.

The head 3 has a bearing 36 in which a sleeve 37 is slidably mounted. The sleeve 37 has a keyway 38 therein in which a suitable key 39 is disposed for preventing rotation of the sleeve 37 during the longitudinal movement thereof in the bearing 36. The sleeve 37 is provided with a rack portion 40 which engages with a gear sector 41 pivoted to the head 3, as illustrated at 42, and which is operated by a lever 43. Movement of the gear sector 41 causes the said sleeve 37 to be reciprocated in the bearing 36. The sleeve 37 has a work supporting tube 44 rotatably supported therein and to which the work or lens holder 45 is connected by a threaded rod 46 threadedly connected within the threaded bore of a reduced extension 47 on the holder 45. A suitable key connection 48 locks the holder 45 to the tube 44 so that the said connected portion of the holder will rotate therewith. The tube 44 is slidably connected with a gear 49 by means of a key and keyway connection 50 and 51. The gear 49 is rotatably attached as by suitable key projections 52 to a circumferentially grooved portion 53 on the bearing 36. The gear 49 is in constant mesh with a gear sector 54 attached adjacent the lower end thereof to the shaft 9 so that when motion is imparted to said shaft 9 through the movement of the gear sector 8 by means of the lever 11 it will cause the said gear 49 to rotate simultaneously with the rotation of the gear 7 and transmit rotary movement to the work or lens 30. The lens 30 is moved with the sleeve 37 toward the cutting tool 14 by depressing the lever 43. Collars 55 and 56 are attached on the tube 44 adjacent the opposed ends of the sleeve 37 for joining said tube and sleeve into a single moving element carrying the work holder 45 and rack 40 therewith when the lever 43 is operated. The shaft 9 is provided with an intermediate telescopic connection 57 universally connected at 58 and 59 to the inner ends of said shaft. This permits the head 3 to be swung to different angular positions The work or lens holder 45 is provided with a pad 60 having centering and aligning means 61 and 62 on the face thereof, as illustrated in Fig. VI. The lens is located in aligned position on said pad and is held thereon by a pad 63 which engages its opposed surface. The pad 60 has a stud 64 rotatably supported in a suitable roller bearing 65 and connected as illustrated at 66 to a tapered member 67 which has the reduced threaded extension 47 thereon. The taper of the portion 67 is forced into binding relation with a tapered end formed on the tubular member 44 and to which the said holder 45 is connected. The tapers automatically locate the holder in axial relation with the tubular member when the clamp screw 46 is tightened. The pad 63 has a ball connection 68 with an arm 69 so that the said pad 63 is free to rotate with the pad 60, stud 64 and tapered member 67 when the tubular member 44 is rotated.

The stud 64, as previously stated above, is rotatably supported in the bearing 65 carried by an arm 70. The arm 70 is pivotally connected with the arm 69, as illustrated at 71. The arm 69 is preferably formed of resilient material and is urged toward the arm 70 to force the pad 63 into clamped relation with the work or lens 30 by means of a hook-shaped member 72 pivotally connected at 73 to a lever 74. The lever 74 is pivotally attached at 75 to the arm 69 and is provided with a cam member 76 pivotally connected at 77 adapted to be rotated by a lever 78. The cam is so designed that when rotated by the lever 78 a high spot 79 thereof is adapted to engage the outer surface of the arm 69 and force the same toward the arm 70. This is brought about by the engagement of the hook-shaped member 72 with a suitable pin 80 carried by a projection 81 on the arm 70. When the pressure of the cam 79 is released the hook-shaped member 72 may be swung clear of the pin 80 to allow the arm 69 to swing outwardly and release the pressure on the work 30. It is apparent that a direct view of the aligning means 61 and 62 may be obtained when positioning the lens in the holder 45.

The arm 70 of the holder 45 is held against rotation by a slide projection 82 and associated tongue 83. The tongue 83 is adapted to cooperate with the projection 82 to form a channel in which the arm 70 is free to move with the work 30 when the lever 43 is operated. The tongue 83 is pivoted at 84 so that it may be swung sidewise to permit removal of the arm 70 when it is desired to detach the holder 45 from its associated holding mechanism.

The cutting operation is performed substantially as follows:

A former 6 of the desired contour shape is placed on the shaft 5, it being understood that a suitable detachable connection is provided whereby the former may be quickly and easily placed on the end of the shaft. This connection may be of the type generally known in the art. The contact shoe 18 is then moved into engagement with the former under the action of the spring 20.

The lens to be cut is properly aligned with the pad 60 and the pad 63 is moved into clamping engagement therewith. After the lens 30 has been properly aligned in the holding device 45 the said holding device is secured in the tube 44 by the clamp screw 46. The key 48 locates the lens in proper axial position with the axis of the former 6. The clamp screw 31 is then loosened and the head 3 is swung about the pivot 29 to locate the surface of the lens in proper relation with the longitudinal axis of the cutting tool. This action is such as to dispose the portion of the surface of the lens which is to be engaged by the cutting tool in substantial normal relation with the longitudinal axis of the cutting tool. The clamp screw 31 is then tightened to hold the lens in this position. The head 3 is then adjusted longitudinally in the slideway in the member 28 by means of the screw 32 until the dial 34 indicates the size of lens desired.

The lever 43 is then depressed to force the lens 30 and associated holding mechanism toward the cutting tool 14 at which position the lens 30 will engage the cutting tool 14. The lever 11 is then operated to cause the former 6 and lens 30 to be simultaneously rotated through the gear connections 7 and 49 with the gear sectors 8 and 54 mounted on the shaft 9. The ratio of the gearing is such that the former 6 and lens 30 will be rotated equal amounts so that the axial relation of the former 6 and lens 30 will be maintained during rotation. The gear sectors and associated operating mechanism are so designed as to impart one complete revolution to the work or lens 30 so that the path of the tool 14 controlled by the contour shape of the former 6 will be traced throughout only one cycle of movement. This causes the lens 30 to be cut to the shape of the former 6 and to the size indicated by the dial 34 and indicator means 35.

Due to the fact that the weight of the supporting mechanism for the tool is relatively light there will be no tendency for the said tool and contact shoe 18 to move outwardly away from the contour of the former 6 during the cutting operation. This permits irregular contour shapes to be accurately cut.

From the foregoing description it will be seen that simple, efficient and economical means have been provided for accomplishing all of the objects and advantages of the invention, particularly that of a holding device wherein the lens may be accurately positioned and quickly and easily attached or removed from the cutting machine. It is also apparent that due to the horizontal movement of the work 30 into the cutting tool, pressure caused by the action of gravity is eliminated and the pressure of the work relative to the tool may be more positively controlled. The cut may be formed in a direction substantially normal to the surface of the work regardless of the surface shape of said lens. A simple pull of the lever 11 causes only one complete revolution of the work 30 relative to the cutting tool so that a more accurate cut may be obtained. The various adjustable parts are disposed so that they may be readily manipulated and accurate adjustments may thereby be quickly and easily obtained.

It is to be noted that the point of the cutting tool 14 lies substantially on the longitudinal axis of the pivot 29 so that the work supporting head may be moved to different angular positions about the axis of the pivot means 29 with materially no change being introduced in the resultant size of the lens which is to be cut and which is controlled by scale and indicator means 34 and 35.

Having described my invention, I claim:

1. A work holder for use with a device of the character described having a rotary work support with attaching means having a hollow portion to receive said work holder, said work holder having means for holding work therein and having a tapered portion adapted to extend within the hollow portion of the work support and means for connection with said attaching means when in this position.

2. A work holder for use with a device having attaching means with a hollow portion, said work holder having rotatable clamp members and means for securing work between said clamp members, one of said clamp members having a portion shaped to extend within the hollow portion of the attaching means of the device and means on said portion extending within said hollow portion for connection with said attaching means, said work holder being removable from said hollow portion while maintaining said work secured between said clamp members.

3. In a device of the character described, the combination of a base having spaced supports thereon, one of said supports having a hollow member rotatably supported thereon and the other of said supports having a former rotatably supported thereon, a cutting tool pivotally connected with said base having a contact shoe engaging the said former and work holding means having rotatable clamp members and means for securing work between said clamp members, one of said clamp members having a portion shaped to extend within the hollow member and means on said hollow member connected with said portion shaped to extend within said hollow member for holding said work holder and said hollow member together, said work holder being removable from said hollow member while maintaining said work between said clamp members.

4. In a device of the character described, the combination of a base having spaced supports thereon, one of said supports having a hollow member rotatably supported thereon and the other of said supports having a former rotatably supported thereon, a cutting tool pivotally connected with said base having a contact shoe engaging the said former and work holding means having rotatable clamp members and means for securing work between said clamp members, one of said clamp members having a portion shaped to extend within the hollow member, means on said hollow member connected with said portion shaped to extend within said hollow member for holding said work holder and said hollow member together and means for rotating said former and said clamp member simultaneously, said clamp members being removable as a unit with said work secured therebetween.

5. In a device of the character described, the combination of a base having spaced supports thereon, one of said supports having a hollow member rotatably supported thereon and the other of said supports having a former rotatably supported thereon, a cutting tool pivotally connected with said base having a contact shoe engaging the said former and a work holding unit comprising rotatable clamp members and means for securing work between said clamp members, one of said clamp members having a portion shaped to extend within the hollow member, means on said hollow member connected with said portion shaped to extend within said hollow member for removably holding said work holding unit and said hollow member together and means for disposing said work holder and said work carried thereby to different angular relations with respect to the longitudinal axis of the cutting tool.

6. In a device of the character described, the combination of a base having spaced supports thereon, one of said supports having a connection portion rotatably supported thereon and the other of said supports having a former rotatably supported thereon, a cutting tool pivotally connected with said base having a contact shoe engaging the said former and work holding means having rotatable clamp members and means for securing work between said members, one of said clamp members having a connection portion shaped to interfit with the rotatable connection portion on one of said supports and means for removably connecting said portions together in this relation, whereby said clamp members may be removed from said support while maintaining said work in said secured relation.

ALBERT E. MAYNARD.